(12) United States Patent
Beselt et al.

(10) Patent No.: US 8,064,107 B2
(45) Date of Patent: Nov. 22, 2011

(54) TENSIONED SCANNER RAILS

(75) Inventors: Ronald E. Beselt, Burnaby (CA); John A. Harjula, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 1161 days.

(21) Appl. No.: 11/225,958

(22) Filed: Sep. 14, 2005

(65) Prior Publication Data

US 2007/0058212 A1    Mar. 15, 2007

(51) Int. Cl.
*H04N 1/04* (2006.01)
(52) U.S. Cl. ......... 358/486; 358/505; 358/474; 358/498
(58) Field of Classification Search .................. 358/474, 358/442, 497, 505, 1.1–305, 484, 494
See application file for complete search history.

(56) References Cited

U.S. PATENT DOCUMENTS

| | | | |
|---|---|---|---|
| 4,879,471 A | | 11/1989 | Dahlquist |
| 6,848,381 B2 | | 2/2005 | Thomas |
| 6,879,413 B1 | * | 4/2005 | Hayashi et al. ............... 358/474 |
| 7,090,329 B2 | * | 8/2006 | Nellen ............................ 347/37 |
| 2002/0003207 A1 | * | 1/2002 | Fang ............................. 250/234 |
| 2004/0012824 A1 | * | 1/2004 | Haas et al. ..................... 358/474 |
| 2004/0154516 A1 | * | 8/2004 | Thomas ...................... 114/102.1 |
| 2005/0036177 A1 | * | 2/2005 | Harris et al. .................. 358/474 |
| 2006/0031991 A1 | * | 2/2006 | McDaniel et al. ................ 5/611 |
| 2007/0050212 A1 | * | 3/2007 | Kearby et al. ..................... 705/3 |
| 2007/0058212 A1 | * | 3/2007 | Beselt et al. .................. 358/474 |

FOREIGN PATENT DOCUMENTS

WO    WO 03/037111 A1    5/2003

* cited by examiner

*Primary Examiner* — Benny Tieu
*Assistant Examiner* — Marcellus Augustin
(74) *Attorney, Agent, or Firm* — Cascio Schmoyer & Zervas

(57) ABSTRACT

A rail system made of one or more flexible guide rods, each consisting of a tension rod, is used to support lightweight, mobile devices such as carriages, scanning heads or optical sensors. The rail is configured to permit movement of the mobile device, when driven by an external drive mechanism, along a main scanning direction but prohibits rotational movement of the mobile device. In this fashion, the mobile device remains substantially at the same measured distance from the flat surface of an object, e.g., moving sheet or web, being analyzed.

30 Claims, 3 Drawing Sheets

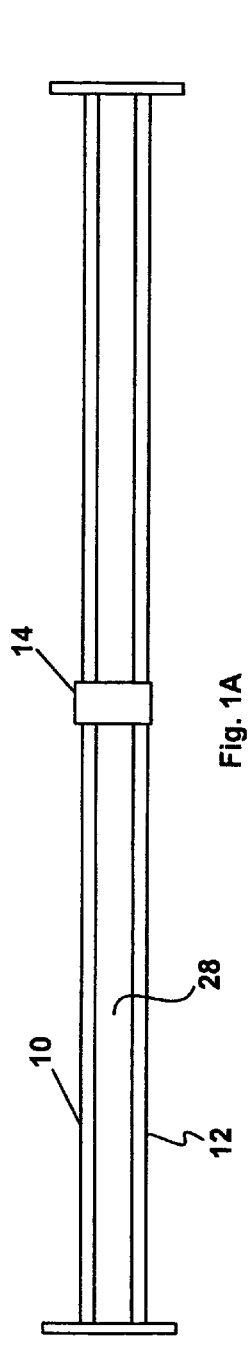
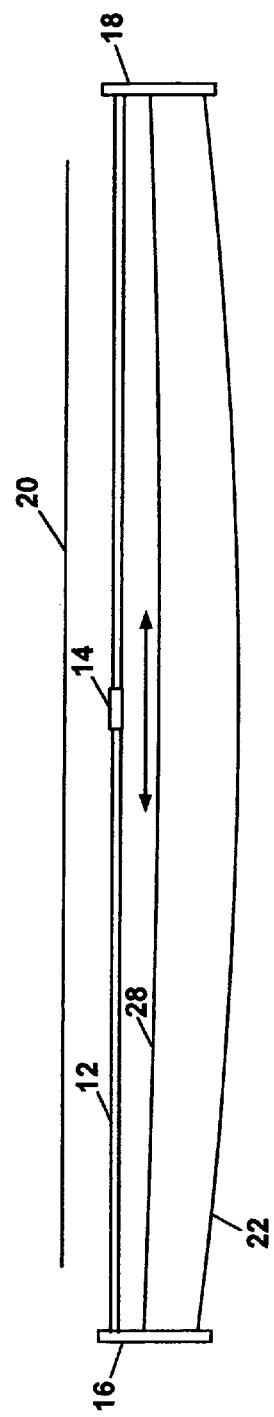
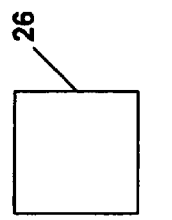
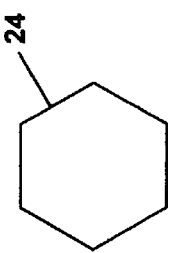
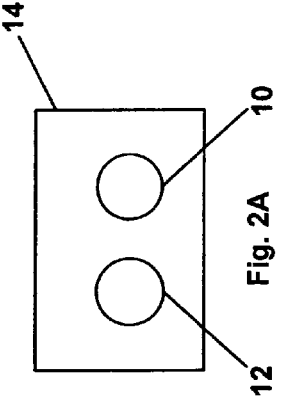

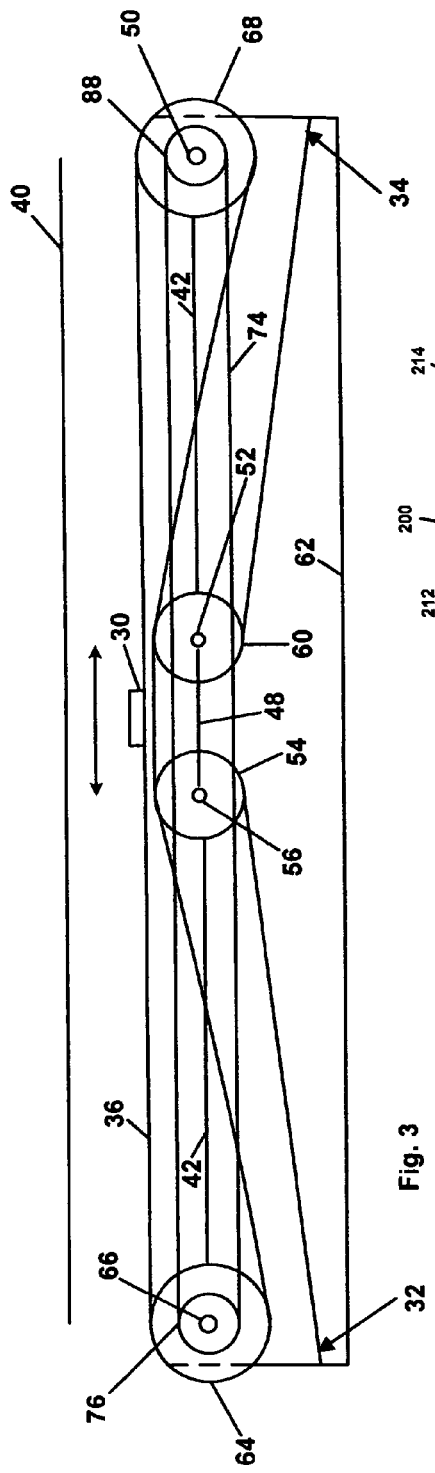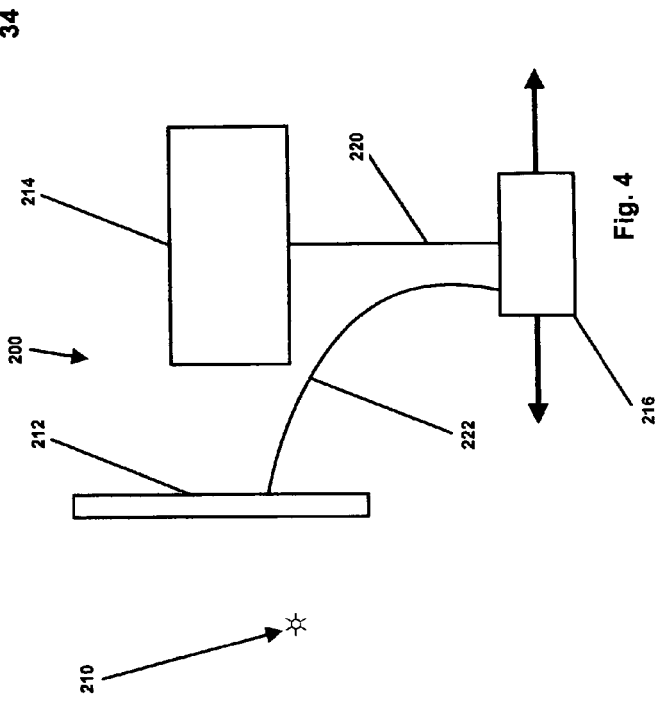

TENSIONED SCANNER RAILS

FIELD OF THE INVENTION

The present invention generally relates to tensioned scanner rails that support a mobile device that traverses back and forth along a linear path and, in particular, relates to scanner rails that employ one or more tension rods to guide a mobile carriage or optical head between front and back ends along a main, linear scanning direction such that the moving carriage or optical head remains at a measured distance from a relatively flat surface that is being analyzed.

BACKGROUND OF THE INVENTION

It is often desirable to obtain measurements of selected characteristics of sheet materials during manufacture. Although various properties of sheet materials can be detected by off-line laboratory testing, such tests often are not practical because of the time required for sample acquisition and analysis. Also, laboratory testing has the shortcoming that samples obtained for testing may not accurately represent sheet material that has been produced.

To overcome the drawbacks of laboratory testing of sheet materials, various sensor systems have been used for detecting sheet properties "on-line," i.e., on a sheet-making machine while it is operating. Typically, on-line sensor devices are operated to periodically traverse, or "scan," traveling webs of flat sheet material during manufacture. Scanning usually is done in the cross direction, i.e., in the direction perpendicular to the direction of sheet travel. Depending upon the sheet-making operation, cross-directional distances can range up to about 10 meters or more.

A wide variety of scanning sensor devices has been used for on-line measurements of sheet materials. In the paper-making industry, for example, spectrometric scanning sensors have been employed for on-line detection of characteristic sheet materials. A spectrometric scanning system typically includes a stationary frame having a pair of stiff upright end members that stand on a factory floor for supporting a pair of parallel, solid guide members or rails that extends horizontally across the opposite faces of a traveling sheet. The guide members often are quite massive. Adjustment systems may be employed to straighten the guide members independent of the upright end support structure to compensate for non-straightness of the guide member or weight deflection. A motor driven carriage is mounted to travel on the guide members. The carriage is connected to a drive system to be driven back and forth across sheet. The scanning sensor system also includes a scanning head that is mounted on the carriage member. The scanning head contains the detection components. For example, in the case of a spectrometric analyzer, the scanner head can include a source of infrared light, collimating and beam-splitting mirrors, and photosensitive detector.

In order to monitor and control a flat sheet manufacturing process, it is desirable and sometimes necessary to position across directional scanning sensors at a number of strategic locations throughout the process. However, this is often very difficult because of space restrictions in a facility. In particular, since a sensor is ordinarily influenced in some manner by the distance between it and the object being measured, the supporting guide members, e.g., beam, which span the width of the process, have typically been designed with very high structural inertia to counter the deflection caused by sag and vibration. To generate the required inertia levels, however, the dimensions of the guide members often become so large that they cannot fit within the space allotted. While sag can be compensated for with manufacturing methods, long and bulky, low inertia, guide members are still susceptible to resonant vibration deflection. Thermal distortion of the structures caused by uneven heating often times must be dealt with no matter how strongly the guide members are built.

SUMMARY OF THE INVENTION

The present invention is based in part on the recognition that a rail system constructed of one or more flexible guide rods, each comprising a tension rod, can be employed to support lightweight, mobile devices such as, for instance, carriages, scanning heads or optical sensors. The inventive rail is particularly suited for spanning over relatively long distances in plant facilities where space is limited; the rail is typically at least about two meters in length in order to benefit from the rail system.

In one embodiment, the invention is directed to a tensioned scanner rail for supporting a mobile device, such as a carriage or an optical head, that moves between a first end and a second end along a main scanning direction that includes:

a rail that comprises one or more flexible guide rods spanning between the first end and the second end, wherein each flexible guide rod comprises a tension rod, wherein the rail is configured to permit movement of the mobile device along the main scanning direction and to provide rotational restraint of the mobile device; and means for maintaining sufficient tension on the rail so that the length of the rail defines a substantially linear path that is parallel to the axis of the main scanning direction.

In another embodiment, the invention is directed to a scanning mechanism, for detecting characteristics of a sheet of material, which moves a mobile detector device between a first end and a second end along a main scanning direction that includes:

a rail that comprises one or more flexible guide rods spanning between the first end and the second end, wherein each flexible guide rod comprises a tension rod, wherein the rail is configured to permit movement of a mobile detector device along the main scanning direction and to provide rotational restraint of the mobile device;

a detector device that is slidably supported by the rail;

means for driving the mobile detector device along the main scanning direction; and means for maintaining sufficient tension on the rail so that the length of the rail defines a substantially linear path that is parallel to the axis of the main scanning direction.

In a further embodiment, the invention is directed at a method of guiding a mobile device back and forth along a main scanning direction that is substantially equidistance from the surface of a material that include the steps of:

(a) providing a scanning system that comprises a tensioned scanner rail that comprises:

(i) a rail that comprises one or more flexible guide rods spanning between the first end and the second end, wherein each flexible guide rod comprises a tension rod, wherein the rail is configured to permit movement of the mobile device along the horizontal path and to provide rotational restraint of the mobile device; and (ii) means for maintaining sufficient tension on the rail so that the length of the rail defines a substantially linear path that is parallel to the axis of the main scanning direction;

(b) moving the mobile device back and forth between two ends of the main scanning direction characterized in that the mobile device remains at a measured distance from the surface of the material.

The tension rods are inherently flexible elongated guides that are made, for instance, from parallel lay rope, pultrusion or other high specific tensile strength material under high tension to provide a straight path for a lightweight sensor to travel on. Such a design has a number of advantages including: inherent insensitivity to thermal distortion, high natural frequencies, high damping, naturally straight design for low manufacturing cost, and compact cross section.

The inventive tensioned scanner rail is particularly suited for supporting a mobile optical head that is incorporated into a scanning system that uses optical fiber to transmit light from a light source to the moving optical head and relaying optical signals back through an optical fiber to a detector system for signal processing. Both the light source and detector system are located in an off-system site.

BRIEF DESCRIPTION OF THE DRAWINGS

FIGS. 1A and 1B are the top plan and side elevational schematic views, respectively, of a tensioned scanner rail;

FIG. 2A, 2B, and 2C are cross-sectional views of rails;

FIG. 3 is a schematic of a drive mechanism for moving a carriage or optical head of a scanning system;

FIG. 4 is a sensor layout of a scanning system; and

DETAILED DESCRIPTION OF PREFERRED EMBODIMENTS

Figure 5:
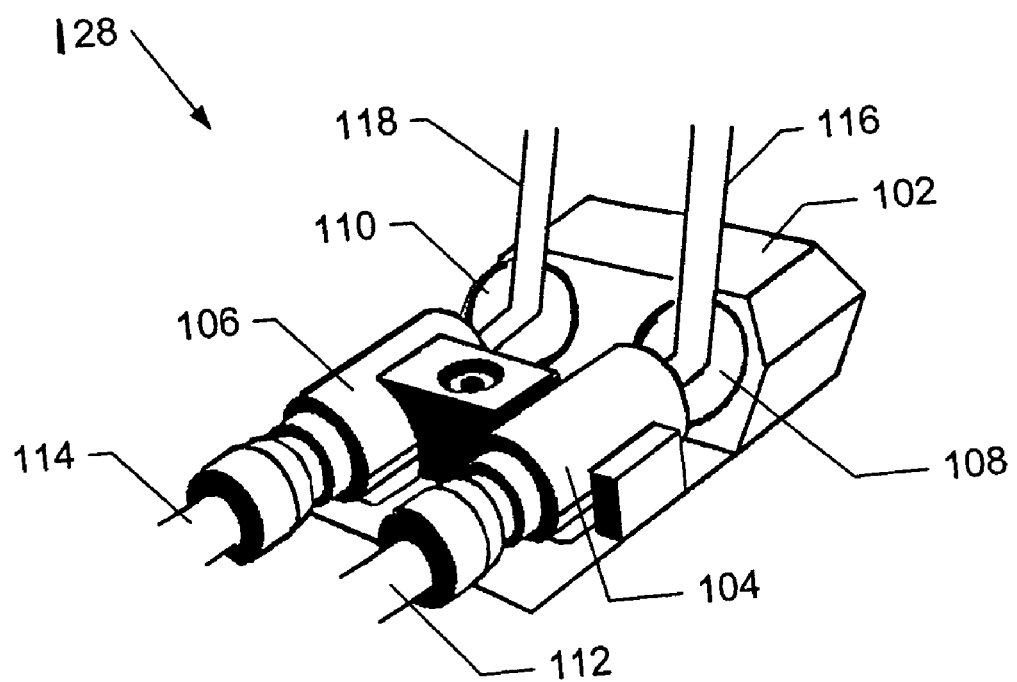
FIG. 5 illustrates a sensor head.

FIGS. 1A and 1B illustrates an embodiment of the tensioned scanner rail system that includes a tensioned rail that comprises two continuous length flexible guide rods 10, 12 that are secured to arms 16, 18 which project from the ends of the small cross section tension beam or canopy 22. A light weight, mobile device, such as an optical head 14, is supported by the flexible guide rods 10, 12 and scans back-and-forth along the cross direction of the process with application of a drive force as further described herein. Suitable mobile devices include, for example, carriages, detector devices such as optical head or sensor package, and the like. In this example, the mobile optical head 14 is positioned below the sheet of material 20 which moves continuously in the machine direction perpendicular to the path of the optical head 14. It is understood that the optical head can be positioned on either or both sides of the sheet depending on the type of scanner used.

The ends of the pair of flexible guide rods 10, 12 are attached to the arms 16, 18 by conventional means such as fittings that can adjust the preload, i.e. the level of tension, which is applied to each flexible guide rod. Relaxation of the preload due to thermal expansion differences between the carbon fiber tension rails and the steel tension beam structure during ramp-up to the operating temperature is taken into account by calculating the room temperature preload required to produce the minimum preload at the operating temperature. The contour of the upper surface 28 of tension beam 22 is preferably concave; this configuration affords sufficient physical clearance so that the optical head 14 does not come into contact with the tension beam 22 as it scans back-and-forth even if the tension beam should sag or vibrate. The tension beam 22 also affords impact protection for the rail; however, employing the tension beam 22 may not be feasible for safety and other considerations. In that case, the flexible guide rods 10, 12 can be secured to any appropriate structure in the plant facility that has sufficient structural strength and integrity to maintain sufficient tension on the rail such that the length of the rail defines a substantially linear path that is parallel to the axis of the main scanning direction. For example, when the tensioned scanner rail is used in a papermaking facility, the ends of the flexible guide rods 10, 12 may be attached to the papermaking machine frame or some other secure anchor point.

FIG. 2A shows the cross section of the pair of flexible guide rods 10, 12 supporting the optical head 14. In this configuration, the optical head 14 defines two parallel bores through which the guide rods 10, 12 are positioned. The inner bore surface that is in contact with the guide rods preferably is made of a low-friction, abrasion resistant material that is compatible with the guide rod material. As is apparent, more than two flexible guide rods can be employed and the optical head would have a corresponding number of bore. In addition, using the two rods 10, 12 provide rotational constraint and load sharing. In this fashion, the upper surface of the optical head remains facing the sheet being measured; moreover, the distance between the optical head and the sheet should be substantially constant even as the optical head moves between the ends of the flexible guide rods. As shown in FIG. 2A, the optical head 14 envelops the two guide rods 10, 12. Alternatively, the optical 14 can be is equipped with a bearing surface or rollers so that it can slide over the flexible guide rods with minimum friction. This latter configuration allows the optical head to be readily lifted off from the supporting flexible guide rods.

Alternately, rails using rods with non-circular cross sections may be used for the rail to provide rotational constraint with only one cross directional rail. FIGS. 2B and 2C illustrate flexible guide rods with hexagonal 24 and square-shaped 26 cross sections, respectively. Any suitable polygonal shaped rod can be employed. Pultruded composite tension rods having hexagonal cross sections are described in U.S. Pat. No. 6,848,381 to Thomas which is incorporated herein by reference. Using non-circular flexible guide rods has the added benefit of permitting uneven wear on the rods to be more readily detected.

A feature of the present invention is the use tension rods for the flexible guide rods in the rail scanner. The term "tension rod" is meant to encompass a flexible elongated rod that is made of high specific tensile strength material. Tension rods include, for example, composite fiber-reinforced resin tension rods, or cables made up of multiple rods, generally formed by pultrusion, that comprises carbon-fiber-reinforced resins, or resins reinforced with other fibers which include, for example, various commercially available synthetic materials known as KEVLAR, SPECTRA, ZYLON and TWARON. Unlike ropes or lines made of strands of twisted fibers, tension rods used in the present invention are essentially creep-free, resistant to abrasion, and dimensionally stable under handling or coiling. The tension rods use will typically have a diameter (or flat diameter when the tension rod has a polygonal cross section) of 3 mm to 12 mm and preferably of 4 mm to 8 mm. Suitable tension rods can be made from carbon rods, known individually as the LASER ROD, that have a 6.35 mm diameter from Wee Bee Enterprises (Beaufort S.C.). The diameters of the flexible guide rods of the rail scanner are scaled up with sensor package, e.g., optical head 14, weight for a prescribed allowable deflection (sag) limit. However, employing larger rods also requires increasing tensions because larger rods will require enormous tensions just to hold themselves up. In contrast, if the diameters of the rods are too small, the flexible guide rod will not be able to carry enough tension to hold up a significant load. Therefore, tension rods with diameters of between 4 and 8 mm represent a practical balance.

Referring to FIG. 1, in one preferred embodiment, the rail is made of solid carbon fiber pultruded rods, each having a diameter of approximately 6 mm and that are attached to at either end to a beam to establish and maintain rod tension.

FIG. 3 illustrates a drive and cable take-up mechanism for moving the mobile optical head which includes a frame 62 that is constructed of steel or other material(s) of sufficient structural strength. Typically, for scanning systems that are employed to scan in the cross direction of a moving sheet or web 40, the length of the frame 62 is about the same as the width of the moving sheet 40 so that the optical head 30 is able to traverse the entire width along the cross direction. This distance can be six to eight meters or more. Located on one side of the frame 62 is a first fixed turning pulley 64 which is secured to the frame by pin 66. Positioned on the other side of the frame is second fixed turning pulley 68 which is secured by pin 50. The distance between pins 50 and 66 preferably ranges from 2 to 12 meters. The diameters of the two fixed turning pulleys 64, 68 are preferably the same. Each pulley preferably has a groove around its outer perimeter that is dimensioned to accommodate a flexible cable.

Situated within the frame 62 and positioned between the two fixed pulleys 64, 68 are a pair of movable or translating pulleys 54, 60 that are linked to each other by a rigid member 48. The pair of movable pulleys 54, 60 is secured by pins 56 and 52, respectively, to a pulley rail 42 which allows the movable pulleys 54, 60 to move back-and-forth along a linear path between the fixed turning pulleys 64, 68. Preferably, the diameters of the movable pulleys 54 and 60 are the same but they are preferably smaller than the diameters of the fixed turning pulleys 64, 68. The centers of the four pulleys 64, 54, 60, and 68 are preferably aligned along a horizontal axis.

An optical fiber cable 36 is partially wound around the four pulleys 64, 54, 60 and 68 as shown. The two ends of the cable 32 and 34 are secured to the frame 62 or other stationary structure. The optical fiber cable 36 should be secured with sufficient tension to avoid excessive slack. No spring or other tension device is needed to secure the two ends. The optical head 30 is operatively connected to the cable 36 as it scans back and forth along the cross direction between the sides of the moving sheet 40. The linked translating pulleys 54, 60 move in the opposite direction to that of optical head 30 but travels at half the speed. In this fashion, the cable 36 remains taut throughout from one end 32 to the other end 34 even when the optical head 30 is in motion. In another embodiment, it is recognized that as the take-up mechanism operates over time, a certain amount of creep may develop in the cable. Thus, the take-up mechanism can be equipped with a spring or other tension device at one or both ends 32 and 34. This will prevent the cable from exhibiting excessive slack. Alternatively, the spring can be positioned in another part of the take-up mechanism such as between the pair of movable pulleys 54, 60. In this case, instead of being connected by a rigid member 48, a member with a spring device can be employed to connect the two of movable pulleys 54, 60.

As is apparent, in the cable take-up mechanism as shown in FIG. 3, the optical fiber cable is guided around a series of pulleys that determine the bend diameters of the optical fiber cable. Surrounding the optical fiber cable is a tensioned mechanical structure that provides a "loose tube" conduit to support the cable over the width of the scanning distance between the two fixed pulleys 64 and 68 without placing tensile forces on the optical fiber. The set of translating pulleys 54, 60 allows the cable to stay under tension without the need of a spring or a loading device. The translating pulleys, which move in unison, assure that the tension on the cable is maintained essentially constant throughout the cable's length. Movement of the translating pulleys in a direction that is opposite to that of the optical head 30 serves to distribute the cable in the direction where it is needed in response to the forces that move the optical head 30. As the optical head 30 moves from one side toward the middle of the cable take-up mechanism, reduction in the length of the cable between fixed turning pulley 64 and translating pulley 54 is offset or compensated by a corresponding increase in the length of the cable between fixed turning pulley 68 and translating pulley 60.

With the cable take-up mechanism, the total bend loss as the optical head moves back-and-forth during scanning is preserved. This is important for scanners that use a spectroscopic sensor that measures the relative powers in two or more different wavelength bands. Bend loss in an optical fiber depends upon bend radius and total bend length. If the bend length or the bend radius changes as the mobile optical head is scanned, measurement errors will be introduced. The cable take-up mechanism keeps the angular bend length and the bend radius constant even as the optical head is moving; this in turn minimizes any sensor error. (Note however that the bend positions are changing.) The bend length for the optical fiber is analogous to the length of an arc, which is a segment of a circle. The bend length for an arc is equal to the product of the diameter and the angle between two radii as measured in degrees radian. Thus, an arc that spans 90 degrees has twice the bend length as an arc with the same radius that spans only 45 degrees. The cable take-up mechanism maintains the same total bend length during scanning.

The optical head 30 can be advanced back and forth along the cross direction by a number of drive mechanisms. As illustrated in FIG. 3, a belt 74 is wound around a drive pulley 76 and driven pulley 88 which is operatively connected to motor (not shown). The belt 74 can be mechanically attached to the optical head 30. Alternatively, the belt can be magnetically coupled to the optical head 30. In operation, control of the motor regulates the speed and direction of the movement of the optical bead. Motorized drive and cable mechanisms are further described in U.S. patent application entitled "Optical Fiber Cable Take-Up Mechanism for Scanning Sensors," Ser. No. 10/994,862 filed Nov. 22, 2004 to Beselt et al., now U.S Pat. No. 7,599,582 issued Oct. 6, 2009, and assigned to Honeywell International Inc., which is incorporated herein by reference.

The drive mechanism illustrated in FIG. 3 employs a pulley rail 42 which spans the frame 62. If for safety and/or other concerns such a rail cannot be employed, then the drive mechanism can be configured as a conveyer system that includes the outside fixed turning pulleys 64, 68 but not the interior pair of translation pulleys 56, 60. This latter design is simpler but it does not route the moving flexible cables while maintaining the radius of curvature of the cable and the nominal total bend length as in the mechanism shown in FIG. 3

FIG. 4 illustrates the sensor layout of a representative scanning system that can be employed to measure the moisture content or other physical properties of a fibrous sheet in the papermaking machine. The scanning system 200 includes a light source 210, optical modulator 212, detector electronics 214, and sensor head 216 which moves back-and-forth along in a linear path adjacent the fibrous sheet. In operation, modulated light from the light source is delivered through a source beam optical fiber 222 to the sensor head 216 where it is focused onto a fibrous sheet. Light that is scattered back from the fibrous sheet is captured by the sensor head 216 and is delivered to the detection electronics 214 via a detector beam optical fiber 220. When measuring sheet properties, the scanning head 216 preferably moves back and forth at a speed of about 0.1 to 10 meters per sec.

Infrared spectroscopy is a preferred technique for moisture content measurements. One approach for single sided IR measurements is to predetermine absorption and reference wavelengths of interest and create a very low resolution spectrometer using band-pass filters and detectors for each channel at the wavelengths of interest. In this regard, the light source 210 provides a constant, reliable, stream of energy within the wavelengths required by the measurement. Moisture measurements typically utilized radiation at wavelengths that yield suitable water absorption peaks.

Given the relatively small dimensions of the flexible guide rods 10, 12 as illustrated in FIG. 1, the optical head must be very compact and lightweight, in order for the tensioned scanner rail to retain substantially linear and equidistance from the sheet 20 being measured. Accordingly, it is preferred that the number of components that comprise the mobile optical head be kept to a minimum as well. For example, the mobile optical head includes an optical element that delivers light to a moving sheet and relays scattered light from the sheet. The light source and other device of the detection system such as the signal processing components are located elsewhere that is remote, stationary compartment which is readily accessible to plant personnel. The mobile optical head should be compact and typically weigh less than 1 kilograms and preferably less than 200 grams.

As shown in FIG. 5, a suitable optical head 128 comprises a body 102 with couplers 104 and 106, which incorporate imaging lenses, for connecting optical fiber 112 that delivers a source beam and optical fiber 114 that delivers a detector beam, respectively. The optical head may optionally comprise a housing that protects it from the environment. Light 116 that is delivered from the optical fiber 112 is reflected from a turning mirror 108 and onto the sheet of material being scanned. Appropriate focusing lenses (not shown) can he employed. Scattered light 118 from the sheet is reflected from the mirror 110 and into the detector beam optical fiber 114. The contours of mirrors 108 and 110 can be fashioned so that light can be imaged onto and then captured from appropriate orientations relative to the moving sheet being scanned; in this case, the focusing lenses (not shown) can be omitted. The mirror's reflective surface can comprise a layer of gold, silver, aluminum, dielectric or other suitable reflective material. Optical sensors are further described in U.S. patent application entitled "Sensor and Methods for Measuring Select Components in Moving Sheet Products," Ser. No. 11/116,498 filed May 9, 2005 to Haran and Beselt., now U.S Pat. No. 7,291,856 issued Nov. 6, 2007, and assigned to Honeywell International Inc., which is incorporated herein by reference.

The inventive tensioned scanner rails can be employed in scanning systems that measure a variety of web or sheet properties. While the scanning system is described with respect to measuring fibrous sheets in a papermaking machine, it is understood that the scanning system can be employed to measure properties of other materials, including, for example, plastics. In the art of making paper with modern high-speed machines, sheet properties must be continually monitored and controlled. The sheet variables that are most often measured include basis weight, moisture content, and caliper, i.e., thickness, of the sheets at various stages in the manufacturing process. Papermaking devices are well known in the art and are described, for example, in Handbook for Pulp & Paper Technologists 2nd ed., G. A. Smook, 1992, Angus Wilde Publications, Inc., and Pulp and Paper Manufacture Vol III (Papermaking and Paperboard Making), R. MacDonald, ed. 1970, McGraw Hill. Sheetmaking systems are further described, for example, in U.S. Pat. No. 5,539,634 to He, U.S. Pat. No. 5,022,966 to Hu, U.S. Pat. No. 4,982,334 to Balakrishnan, U.S. Pat. No. 4,786,817 to Boissevain et al., and U.S. Pat. No. 4,767,935 to Anderson et al. which are incorporated herein by reference. Process control techniques for papermaking machines are further described, for instance, in U.S. Pat. No. 6,149,770 to Hu et al., U.S. Pat. No. 6,092,003 to Hagart-Alexander et al., U.S. Pat. No. 6,080,278 to Heaven et al., U.S. Pat. No. 6,059,931 to Hu et al., U.S. Pat. No. 6,853,543 to Hu et al., and U.S. Pat. No. 5,892,679 to He, which are all incorporated herein by reference.

Optical fiber cables suitable for the take-up mechanism can comprise commercially available light-transmitting fiber optic cables. Optical fiber cables have a core with an index of refraction that is somewhat greater than the refractive index of the surrounding cladding. A preferred optical fiber, which is available from 3M of St. Paul Minn. under part number FG-550-LER, has a silica core with a silica cladding. The cable has a fluoroacrylate polymer coating that surrounds the silica cladding and an exterior poly(ethylene-co-tetrafluoroethylne) coating as well. In this fiber the primary light guiding interface is defined by the silica/silica core/cladding interface, however, extra light transmission is also achieved by the silica/fluoroacrylate polymer coating interface. In another embodiment, the optical fiber or the polymer-cladded optical fiber can be surrounded by a strong non-collapsing tubing of a suitable material such as PEEK which is commercially available from TexLoc Ltd. The optical fiber sits loosely within this PEEK tubing. The fiber PEEK tubing structure is then surrounded by an inelastic or non-stretch material in the form of a rope, for instance. A suitable material is a high-strength fiber that is commercial available as VECTRAN from Celanese Corporation. By applying tension on the exterior rope, the optical fiber can move freely or "float" within the rope.

Optical fibers having high numerical apertures can also be employed. Typically, these optical fibers have a numerical aperture that ranges from 0.1 to about 0.37 to 0.48 or higher. The numerical aperture is a function of the optical properties and in particular the index of refraction difference between the core and the cladding of the optical fiber. The numerical aperture creates a cone of acceptance for the fibers. Accordingly, light emanating from the fibers may occur anywhere within the region defined by the cone of acceptance. Likewise, light entering the acceptance cone will also enter the fibers. Optical fibers with high numerical aperture are described in U.S. Pat. No. 5,170,056 to Berard which is incorporated herein by reference. These large numerical aperture optical fibers are less sensitive to optical losses due to bending and therefore their employment affords more robust measurements.

Spectrometric scanning systems are further described, for instance, U.S. Pat. No. 5,795,394 to Belotserkovsky et al., discloses a scanning reflective-type infrared coating sensor and U.S. Pat. No. 6,404,502 to Preston et al. discloses a reflective-type gloss sensor, both patents are incorporated herein by reference. On-line scanning sensor systems for optically measuring the dry basis weight, basis weight, and moisture content of fibrous sheets during papermaking manufacture are disclosed in U.S. Pat. No. 4,879,471 to Dahlquist, U.S. Pat. No. 5,094,535 to Dahlquist et al., and U.S. Pat. No. 5,166,748 to Dahlquist, all of which are incorporated herein by reference.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A guide rail system for mitigating effects of thermal distortion which occur in between an initial temperature and an operating temperature during linear translation along a translation axis of at least two meters in length of a bi-directionally driven mobile device being disposed on said guide rail system such that said mobile device remains in a substantially constant, temperature independent, spaced apart relationship to a planar surface, said guide rail system comprising:
- a structure having a first anchor point and a second anchor point; and
- at least one flexible tension rod being attached to said structure wherein said tension rod has a first end attached to said first anchor point and a second end attached to said second anchor point, said mobile device being carried on said flexible tension rod with unrestrained movement along said flexible tension rod and with substantially constrained movement rotationally about said flexible tension rod, said flexible tension rod being attached to said structure with a preload tension selected at said initial temperature such that said flexible tension rod becomes aligned commensurately with said translation axis and maintains substantial alignment with said translation axis irrespective of thermally induced distortion of said structure occurring between said initial temperature and said operating temperature, said structure having sufficient strength and integrity to maintain tension within said flexible tension rod at said initial temperature.

2. The guide rail system of claim 1 wherein said structure includes a tension beam having a first end, a second end, a first arm projecting from said first end at which said first anchor point is disposed, a second arm projecting from said second end at which said second anchor point is disposed and a surface in a facing relationship to said flexible tension rod and spaced apart therefrom with sufficient clearance for movement of said mobile device.

3. The guide rail system of claim 2 wherein said surface is concave such that said clearance is maintained in the event of one of sag and vibration being induced in said flexible tension rod.

4. The guide rail system of claim 2 wherein said tension beam is adapted to be mounted to an industrial machine.

5. The guide rail system of claim 1 wherein said structure is an existing framework of an industrial machine.

6. The guide rail system of claim 1 wherein said preload tension is selected wherein a minimum tension is maintained in said flexible tension rod at said operating temperature to eliminate substantially sag of said flexible tension rod irrespective of a position of said mobile device along said translation axis.

7. The guide rail system of claim 1 wherein said flexible tension rod has a noncircular cross-section, said mobile device having an aperture dimensioned commensurately with said non-circular cross-section, said flexible tension rod being received through said aperture in slidable engagement along said translation path, said non-circular cross-section restraining rotation of said mobile device about said flexible tension rod.

8. The guide rail system of claim 7 wherein said non-circular cross-section is multilateral.

9. The guide rail system of claim 1 further comprising a further rod attached to said structure parallelly with said at least one flexible tension rod, said mobile device being carried on each of said at least one flexible tension rod and said further rod with unrestrained movement along said translation path, said further rod substantially constraining movement rotationally about said flexible tension rod.

10. The guide rail system of claim 9 wherein said further rod is a flexible tension rod.

11. The guide rail system of claim 9 wherein each of said at least one flexible tension rod and said further rod have a circular cross-section, said mobile device having a pair of apertures wherein each of said apertures is dimensioned commensurately with said circular cross-section of a respective on of said at least one flexible tension rod and said further rod, said at least one flexible tension rod and said further rod being received through said respective one of said apertures in slidable engagement along said translation path.

12. The guide rail system of claim 9 wherein said mobile device has a bearing surface in intimate slidable engagement with each of said at least one flexible tension rod and said further rod.

13. The guide rail system of claim 1 wherein the mobile device is a detector device.

14. The guide rail system of claim 1 wherein the mobile device is an optical head.

15. The guide rail system of claim 1 wherein the mobile device is a carriage.

16. The guide rail system of claim 1 wherein each of said at least one flexible tension rod has a diameter that ranges from 4 mm to 8 mm.

17. A scanning mechanism for detecting characteristics of a sheet of material wherein the scanning mechanism includes a guide rail system for mitigating effects of thermal distortion which occur in between an initial temperature and an operating temperature during linear translation along a translation axis of at least two meters in length of a bi-directionally driven mobile detector device carried by said guide rail system such that said mobile detector device remains in a substantially constant, temperature independent, spaced apart relationship to a planar surface of the sheet of material, said scanning mechanism comprising:
- a structure having a first anchor point and a second anchor point;
- at least one flexible tension rod being attached to said structure wherein said tension rod has a first end attached to said first anchor point and a second end attached to said second anchor point, said mobile device being carried on said flexible tension rod with unrestrained movement along said flexible tension rod and with substantially constrained movement rotationally about said flexible tension rod, said flexible tension rod being attached to said structure with a preload tension selected at said initial temperature such that said flexible tension rod becomes aligned commensurately with said translation axis and maintains substantial alignment with said translation axis irrespective of thermally induced distortion of said structure occurring between said initial temperature and said operating temperature, said structure having sufficient strength and integrity to maintain tension within said flexible tension rod at said initial temperature, said mobile detector device being slidably supported by the at least one flexible tension rod; and means for driving the mobile detector device along a main scanning direction.

18. The scanning mechanism of claim 17 wherein the at least one flexible tension rod solely supports the load of the mobile detector device.

19. The scanning mechanism of claim 17 wherein each of the at least one flexible tension rod has a diameter that ranges from 4 mm to 8 mm.

20. . The scanning mechanism of claim 17 wherein said structure includes a tension beam having a first end, a second end, a first arm projecting from said first end at which said first anchor point is disposed, a second arm projecting from said second end at which said second anchor point is disposed and a surface in a facing relationship to said flexible tension rod and spaced apart therefrom with sufficient clearance for movement of said mobile detector device.

21. The scanning mechanism of claim 20 wherein said surface is concave such that said clearance is maintained in the event of one of sag and vibration being induced in said flexible tension rod.

22. The scanning mechanism of claim 20 wherein said tension beam is adapted to be mounted to an industrial machine.

23. The scanning mechanism of claim 17 wherein said structure is an existing framework of an industrial machine.

24. The scanning mechanism of claim 17 wherein said preload tension is selected wherein a minimum tension is maintained in said flexible tension rod at said operating temperature to eliminate substantially sag of said flexible tension rod irrespective of a position of said mobile detector device along said translation axis.

25. The scanning mechanism of claim 17 wherein said flexible tension rod has a noncircular cross-section, said mobile detector device having an aperture dimensioned commensurately with said non-circular cross-section, said flexible tension rod being received through said aperture in slidable engagement along said translation path, said non-circular cross-section restraining rotation of said mobile detector device about said flexible tension rod.

26. The scanning mechanism of claim 25 wherein said non-circular cross-section is multilateral.

27. The scanning mechanism of claim 17 further comprising a further rod attached to said structure parallelly with said at least one flexible tension rod, said mobile detector device being carried on each of said at least one flexible tension rod and said further rod with unrestrained movement along said translation path, said further rod substantially constraining movement rotationally about said flexible tension rod.

28. The scanning mechanism of claim 27 wherein said further rod is a flexible tension rod.

29. The scanning mechanism of claim 27 wherein each of said at least one flexible tension rod and said further rod have a circular cross-section, said mobile detector device having a pair of apertures wherein each of said apertures is dimensioned commensurately with said circular cross-section of a respective on of said at least one flexible tension rod and said further rod, said at least one flexible tension rod and said further rod being received through said respective one of said apertures in slidable engagement along said translation path.

30. The scanning mechanism of claim 27 wherein said mobile detector device has a bearing surface in intimate slidable engagement with each of said at least one flexible tension rod and said further rod.

* * * * *